Jan. 22, 1935.     C. R. ARNOLD     1,988,932
PROCESS OF RECOVERING GOLD
Filed Nov. 24, 1931

INVENTOR
CRAIG R. ARNOLD
BY
Townsend & Decker
ATTORNEYS

UNITED STATES PATENT OFFICE 1,988,932

PROCESS OF RECOVERING GOLD

Craig Ritchie Arnold, Dahlonega, Ga.

Application November 24, 1931, Serial No. 576,971

3 Claims. (Cl. 209—181)

My invention consists of an improved method or process of recovering gold from sands or ores and relates more particularly to a process involving the mixing of the gold-bearing sand or the ore reduced to a pulp or finely divided state and the commingling thereof with a stream of water which serves as a vehicle for carrying ore or sand and the particles of gold in a stream over one or preferably a series of pockets or between plates containing amalgam or having a suitable amalgamated surface.

In the following description the term "pulp" will be used to designate the sand or the pulverized stamped or finely comminuted gold ore.

The invention consists broadly in passing a stream of inactive liquid, like water, containing the metallic particles in suspension between a pair of electrodes of any suitable form and passing an alternating electric current from one electrode to the other for the purpose of securing precipitation of the metallic particles on an amalgamating surface of one or both said electrodes.

My invention further consists in passing the ore pulp in a slow stream between the electrodes, one or both of which may be amalgamating electrodes and are connected with a source of alternating current by preference and preferably in causing the stream of pulp to bank up and be delayed in its rate of flow opposite the upper of the two electrodes and in position over the lower electrode and in such manner that there will be time for the gravitational effect of gravity upon the particles of ore to take place assisted by the cataphoretic action thereby, by the combined actions, directing the particles of metal to the amalgamating surface of the electrode.

My invention further consists in locally speeding up the flow of the pulp immediately over the amalgamating surface of the electrode to keep the same clean and bright. This cleaning or cleansing effect which is of a mechanical nature may be assisted as hereinafter described by the agitating or activating effect produced by employing an alternating current passed from one electrode to the other, the action of which alternating current upon the amalgamating surface serves to renew its potency by an agitating or disturbing action when the current passes in a direction opposite to that by which the particles are directed by the cataphoretic action to said surface.

In carrying out my invention I may use any kind of electric current but in some instances, as for instance in order to secure a cooperating activating effect, I may employ an alternating current. Also it is within my invention to make both the electrodes amalgamating electrodes which might be done with beneficial results if an alternating current is employed although for use with a direct current one only of the electrodes need be an amalgamating electrode.

While in carrying out the invention I prefer to employ plates or electrodes suitably disposed to form a series of pockets and cooperating with one another to create zones of delayed flow of the pulp in a zone of amalgamation I may, as hereinafter described, employ flat plates or electrodes properly disposed or equipped with means for causing the pulp to bank up in the desired position.

My invention further consists in the details of improvement hereinafter described and involving the passing of the pulp-bearing stream through a restricted space between the electrodes.

While in carrying out my invention I prefer to employ apparatus which in its general form or construction is similar to that heretofore employed in the art of recovering the precious metals from their ores, it is to be understood that my invention differs from those previous processes in which the precious metal is dissolved in a vehicle like cyanide of potassium, and the precipitation is secured by a pure electrolytic or chemical action, since, according to my present invention, I do not employ any chemicals for dissolving the metal in the liquid, but employ the liquid purely as a means of carrying the particles of metal in mechanical suspension between the amalgamating plates and secure the precipitation not by electrolysis or chemical action but by a process which is essentially an electro-mechanical one, in which the precipitation of the metal or the contact thereof with the amalgamating surfaces is secured by gravity and a cataphoretic action of the electric current passed in a direction to assist gravity, and by an action which is in its essence electro-gravitational aiding the parallel of forces.

Figure 1:
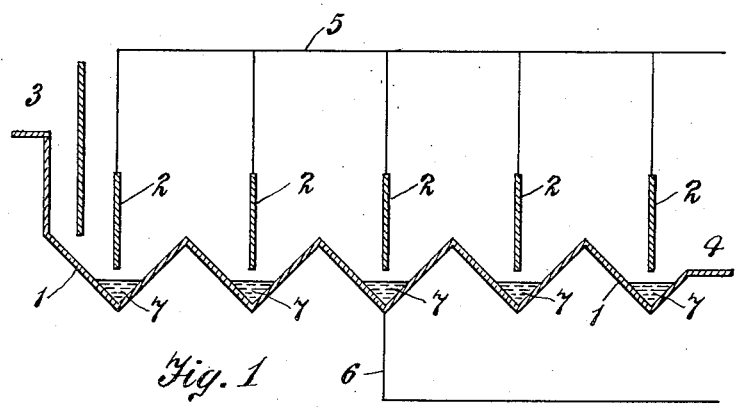
Fig. 1 is a longitudinal section of an apparatus, illustrated in skeleton form, with which my invention may be employed.
Figure 2:
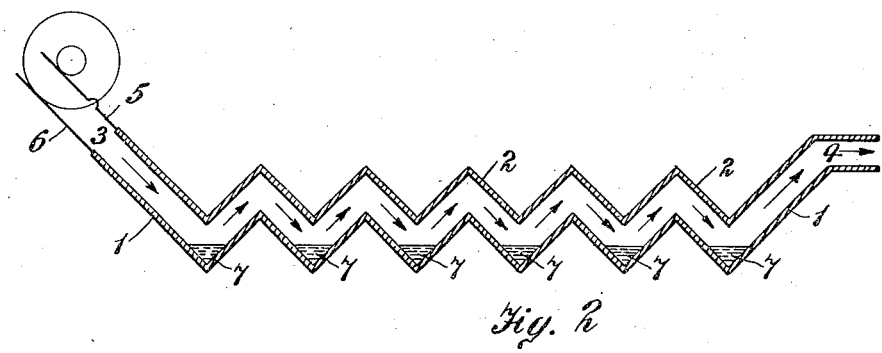
Fig. 2 is a similar section of a modification and shows likewise by the well known symbols a source of A. C. current indicated diagrammatically by the collector rings and brushes of an alternating current dynamo generator.

Referring to the drawing I show at 1 the bottom of a trough suitably formed to provide a series of pockets, each containing at 7 a body of mercury to receive and collect the gold. These bodies of mercury form in substance electrodes of the apparatus. The depressions to hold the mercury may be in the bottom of a plate of metal or other suitable conducting material to which connection may be made by a wire 6 to combine the electrodes as one electrode in an electric circuit of a source of electric energy supplying either alternating or continuous electric current, one terminal of said source being connected to the wire 6 as well understood in the art. 2 indicates suitable conducting plates or electrodes disposed over the electrodes 7, said electrodes 2 being preferably all connected together to a conductor 5 for connection to the other terminal of the alternating or other electric current source. 3 indicates the hopper to receive the headings or body of water containing the pulp and 4 is the apron over which the tailings pass away, suitable provision being made for confining the flow of liquid and causing it to pass from hopper 3 over the amalgamating electrodes 7.

The ore is stamped, crushed or reduced to a finely divided condition in the usual or any proper manner and, commingled with a stream of water or electrolyte of considerable volume or sufficient to cause a free flow of the stream of water, is passed into the hopper 3, and while flowing through the trough in a free but quiet stream an electric current is passed from one electrode to the opposite electrode.

In the apparatus the electrodes 7 alone are the amalgamating electrodes but if an alternating current be employed opposite electrodes might be provided that would have an amalgamating surface or body through which the current would pass to cause them to act as an amalgamating medium when the current changes from one direction to the other.

Owing to the shape of the trough and the disposition of the electrodes 2, the body of liquid carrying the fine particles of gold or other precious metal is compelled to flow downwardly in a quiet stream toward the amalgamating surface of the cathodes or electrodes carrying the fine particles of gold with it, and through a restricted opening between the opposite electrode or cathode, while, moreover, the stream of pulp being momentarily obstructed by the electrodes 2, is compelled to come to a momentary stop directly over the amalgamating pockets before passing on beneath the electrodes 2 and over the surface of the amalgam. The body of liquid with its gold contents then momentarily stopped or banked against one electrode or in the field of the current flowing from the surface of the electrode, the result is that not only are the particles of metal projected toward the plane of the opposite pole or cathode but at the same time the stream being obstructed or delayed in its flow, time is given for the action of the electric current aiding gravity, tending to force or carry them down to the amalgamating surface.

Furthermore, while the flow of the stream is thus delayed, the particles within it will be held within the field of the positive current flowing from the surface of the electrode, which current will thus have time to act according to the well known physical principle known as cataphoretic action and will tend of itself to carry the gold down to the electrode which, for the time being, is in the relation of a cathode to the opposite electrode in case an alternating current is used. Gravity will be thus assisted until the particles of metal find themselves in the field of the electrodes. By these actions, involving the action of gravity assisted by the cataphoretic action, the particles are brought into contact with the amalgamating surface of the cathode. In passing under the anode the pulp now becomes concentrated by the restricted space between the poles and the black sands (the titanic sands, the bete noir of the miner) are forced onward and leaving the surface of the bath of quicksilver bright and free from insulating sands.

While in its essence my invention is capable of being practiced by taking advantage of the electrolytic action of the current upon a chemically treated liquid carrying the ore in suspension and causing the gold particles to attach themselves to the amalgamating surface of the electrode it may also be practiced according to my present invention if the ore is held in suspension in an inactive liquid and in this latter respect is to be clearly distinguished from those prior processes which require the use of a dissolving liquid, adapted for use in an operation which is essentially electrolytic.

Figure 3:
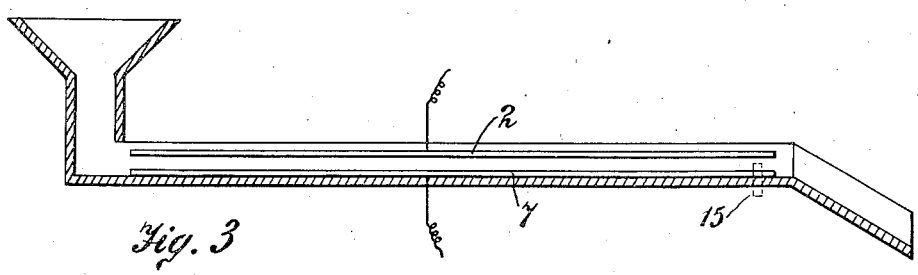
Fig. 3 is a vertical longitudinal section of the device employing continuous flat plates and electrodes instead of the form producing a series of pockets in which the delay of flow takes place individually from one end to the other of the apparatus.

In the modification of my invention shown in Fig. 3 the apparatus instead of presenting a series of delaying pockets as shown in previous figures provides two substantially flat electrodes the lower one or both of which may be amalgamating and may be either together or singly changed in their degrees of inclination to the flow of the pulp and may have an adjustable dam or plate 15 to partially close the space between their ends as indicated in the drawing by the vertical dotted lines at the right hand end of the figure thus causing the banking up effect which I find to be desirable.

What I claim as my invention is:

1. The method of recovering metals from ores or sands consisting in flowing a pulp containing the metallic particles in suspension between a pair of electrodes of any suitable form both of which have an amalgamating surface and passing a rapidly alternating current across the space between them and through the stream to produce precipitation of the metallic particles on an amalgamating surface of both said electrodes.

2. The herein described method of recovering gold from ores or sand by causing a stream of water containing particles of gold in suspension therein to flow between a pair of electrodes both of which are amalgamating electrodes and causing a rapidly alternating current to pass across the space between said electrodes and through the stream to cause precipitation of the metal upon an amalgamating surface of both said electrodes.

3. The herein described method of recovering gold from ores or sand by causing a stream of water containing particles of gold in suspension therein to flow between a pair of plate electrodes both of which are provided with a suitable amalgamating surface and causing a rapidly alternating electric current to pass between said electrodes and through the stream so as to assist gravity to cause precipitation of the metal upon an amalgamating surface of the lower electrode by one phase of said alternating current and to cause precipitation upon the opposite electrode by amalgamating action by the action of opposite phases of said alternating current.

CRAIG RITCHIE ARNOLD.